US009869483B1

(12) United States Patent
Dawson-Haggerty et al.

(10) Patent No.: US 9,869,483 B1
(45) Date of Patent: Jan. 16, 2018

(54) SYSTEM, METHOD, AND COMPUTER PROGRAM FOR CONDITIONING A BUILDING ENVIRONMENT BASED ON OCCUPANCY ESTIMATES

(71) Applicant: Building Robotics, Inc., Oakland, CA (US)

(72) Inventors: Stephen Dawson-Haggerty, Berkeley, CA (US); Andrew Krioukov, Berkeley, CA (US)

(73) Assignee: Building Robotics, Inc., Oakland, CA (US)

( * ) Notice: Subject to any disclaimer, the term of this patent is extended or adjusted under 35 U.S.C. 154(b) by 0 days.

(21) Appl. No.: 15/258,245

(22) Filed: Sep. 7, 2016

Related U.S. Application Data

(62) Division of application No. 14/247,670, filed on Apr. 8, 2014.

(51) Int. Cl.
*F24F 11/00* (2006.01)
*G05D 25/02* (2006.01)
*G05B 15/00* (2006.01)
*G05D 23/00* (2006.01)
*G05D 25/00* (2006.01)
(Continued)

(52) U.S. Cl.
CPC ...... *F24F 11/0034* (2013.01); *F24F 11/0001* (2013.01); *G05B 15/00* (2013.01); *G05B 15/02* (2013.01); *G05D 23/00* (2013.01); *G05D 23/19* (2013.01); *G05D 25/00* (2013.01); *G05D 25/02* (2013.01); *F24F 2011/0035* (2013.01); *G05B 2219/163* (2013.01); *G05B 2219/2614* (2013.01); *G05B 2219/2642* (2013.01)

(58) Field of Classification Search
None
See application file for complete search history.

(56) References Cited

U.S. PATENT DOCUMENTS 8,099,178 B2 1/2012 Mairs et al.
9,528,715 B2 * 12/2016 Aiken .................. F24F 11/0001
9,612,589 B1 4/2017 Dawson-Haggerty et al.
(Continued)

OTHER PUBLICATIONS

Naghiyev, E., et al., "Three unobtrusive domestic occupancy measurement technologies under qualitative review", Energy and Buildings, vol. 69, Feb. 2014, pp. 507-514, ISSN 0378-7788.

*Primary Examiner* — Qing Wu
(74) *Attorney, Agent, or Firm* — Lessani Law Group, PC

(57) ABSTRACT

The present disclosure provides a system, method, and computer program for conditioning a building environment based on occupancy estimates. In one embodiment, the method includes tracking the user's entries to and exits from the building on a mobile device associated with the user for each of a plurality of users. Entry and exit event data from the users' mobile devices are used to estimate occupancy of the building. The conditioning of the building environment is adjusted in accordance with changes in occupancy estimates. In certain embodiments, where the building has a plurality of zones, each entry and exit event may be correlated with one of the plurality of zones. Occupancy is estimated within each zone using the zone-correlated entry and exit events. Alternately, users' locations within the building may be estimated using an indoor localization technique. Each zone is then conditioned in accordance with the occupancy of the zone.

9 Claims, 8 Drawing Sheets

(51) Int. Cl.
*G05D 23/19* (2006.01)
*G05B 15/02* (2006.01)

(56) References Cited

U.S. PATENT DOCUMENTS

| | | |
|---|---|---|
| 2010/0063832 A1 | 3/2010 | Brown |
| 2011/0040391 A1 | 2/2011 | Noecker, Jr. et al. |
| 2011/0113120 A1 | 5/2011 | Johnson et al. |
| 2011/0127340 A1 | 6/2011 | Aiken |
| 2012/0310376 A1* | 12/2012 | Krumm ............... G05B 15/02 700/31 |
| 2013/0184880 A1 | 7/2013 | McMahon |
| 2014/0107846 A1 | 4/2014 | Li |
| 2015/0136379 A1* | 5/2015 | Takeda ............... F24F 11/006 165/237 |
| 2015/0184881 A1* | 7/2015 | Bartenbach ......... F24F 11/006 700/276 |

* cited by examiner

SYSTEM, METHOD, AND COMPUTER PROGRAM FOR CONDITIONING A BUILDING ENVIRONMENT BASED ON OCCUPANCY ESTIMATES

RELATED APPLICATIONS

This application is a divisional of U.S. patent application Ser. No. 14/247,670, filed on Apr. 8, 2014, and titled, "System, Method, and Computer Program for Conditioning a Building Environment based on Occupancy Estimates," the contents of which are incorporated by reference as if fully disclosed herein.

BACKGROUND OF THE INVENTION

1. Field of the Invention

This invention relates generally to building conditioning management systems and, more specifically, to a system and method for conditioning a building environment based on occupancy estimates.

2. Description of the Background Art

Most buildings today operate on schedules. For example, the building's heating, ventilation, and air-conditioning (HVAC) system may turn on at six o'clock every weekday morning to an "occupied mode" (i.e., as if the building were fully occupied) and turn off at seven o'clock every weekday evening to an "unoccupied mode." Rigid scheduling of the building conditioning management systems is problematic because during the occupied mode, the building is often less than fully occupied resulting in the inefficient use of energy and substantial unnecessary costs and during the unoccupied mode, many occupants may still be present due to shifting work hours, project deadlines, company events, etc.

Therefore, there is a need for a system and method for more efficiently conditioning a building environment based on occupancy estimates. This would include tailoring the schedule based on real-time occupancy data or historical occupancy patterns and outputting the conditioning level based on the number of people in a given space.

SUMMARY OF THE DISCLOSURE

The present disclosure relates to a system, method, and computer program for conditioning a building environment based on occupancy estimates. In one embodiment of the invention, the method includes tracking the user's entries to and exits from the building on a mobile device associated with the user for each of a plurality of users. Entry and exit event data from the users' mobile devices are used to estimate occupancy of the building. The conditioning of the building environment is adjusted in accordance with changes in occupancy estimates.

In certain embodiments, where the building has a plurality of zones, the method includes tracking the user's entries to and exits from the building on a mobile device associated with the user for each of a plurality of users. Each entry and exit event may be correlated with one of the plurality of zones. Occupancy is estimated within each zone using the zone-correlated entry and exit events. Each zone is conditioned in accordance with the occupancy of the zone. In alternate embodiments, the method includes estimating the user's location within the building using an indoor localization technique for each of a plurality of users. For each of the users, one or more zones associated with the estimated location of the user are identified. The occupancy of each zone is estimated based on the estimated locations of the users. Each zone is conditioned in accordance with the occupancy of the zone.

In certain embodiments, the occupancy of the building (or zones) is estimated continuously or periodically throughout a period of time and the conditioning of the building/zones is adjusted during the period of time in response to one or more threshold changes in the occupancy estimates. The conditioning of the building environment (or zones) may include at least one of: (i) heating the building/zones, (ii) cooling the building/zones, (iii) ventilating the building/zones, and (iv) lighting the building/zones.

In certain embodiments, each user is associated with a primary zone specified by the user and, in response to receiving notice of an entry event for a user, correlating the entry event with the user's primary zone. In certain embodiments, correlating each entry/exit event with a zone includes, for at least one entry/exit event, mapping a calendar event in a user's calendar to a zone. In certain embodiments, the indoor localization technique includes using measurements related to signals transmitted between the user's mobile device and a plurality of fixed signal transmitters to estimate the user's location (e.g., using a Global Positioning System (GPS), WiFi, or Bluetooth beacons, etc.).

In certain embodiments, the occupancy is estimated at a first time and a second time and the building (or zones) is conditioned at the first time based on the occupancy estimate for the first time and at the second time based on the occupancy estimate for the second time.

In certain embodiments, the building includes an HVAC system and the adjusting step includes monitoring the estimated occupancy to determine whether the estimated occupancy falls below or rises above a predetermined threshold. In response to the estimated occupancy rising above the predetermined threshold, the HVAC system may be transitioned from a first mode of operation to a second mode of operation, where the second mode of operation has a higher energy consumption than the first mode of operation. In response to the estimated occupancy falling below the predetermined threshold, the HVAC system may be transitioned from the second mode of operation to the first mode of operation.

In certain embodiments, estimating occupancy of the building includes setting a geofence around the building. Each of the plurality of users' mobile devices is then tracked when the mobile device enters or exits the geofence. The total number of entry/exit events may be aggregated to determine a minimum number of users in the building. The minimum number may be multiplied by a deployment penetration factor, where the deployment penetration factor is derived from an estimate of the percentage of users in the building that have mobile phones that track and report when the user enters or exits a geofence.

In certain embodiments, the method includes tracking the user's entries to and exits from the building on a mobile device associated with the user for each of a plurality of users. Occupancy of the building is determined as a function of time. Occupancy pattern data is created based on the occupancy as a function of time. The building environment is conditioned based on the occupancy pattern data.

DETAILED DESCRIPTION OF THE PREFERRED EMBODIMENTS

The present disclosure relates to a system, method, and computer program for conditioning a building environment or zones within a building based on occupancy estimates. As used herein, conditioning of the building environment or zones within the building includes at least one of: (i) heating the building/zones, (ii) cooling the building/zones, (iii) ventilating the building/zones, and (iv) lighting the building/zones, among other things that help to make a building environment more comfortable for its occupants. In a preferred embodiment, the heating, cooling, and ventilating is performed by a centrally-controlled HVAC system. The HVAC system may have an "occupied" mode and an "unoccupied" mode. The occupied mode is a higher-energy consumption mode (i.e., an increase in heating/cooling and ventilation) intended for when the building is above a certain occupancy threshold (e.g., during business hours). Conversely, the unoccupied mode is a lower-energy consumption mode (i.e., a decrease in heating/cooling and ventilation as compared to when the building is above the threshold) (e.g., at night or on weekends).

Figure 7:
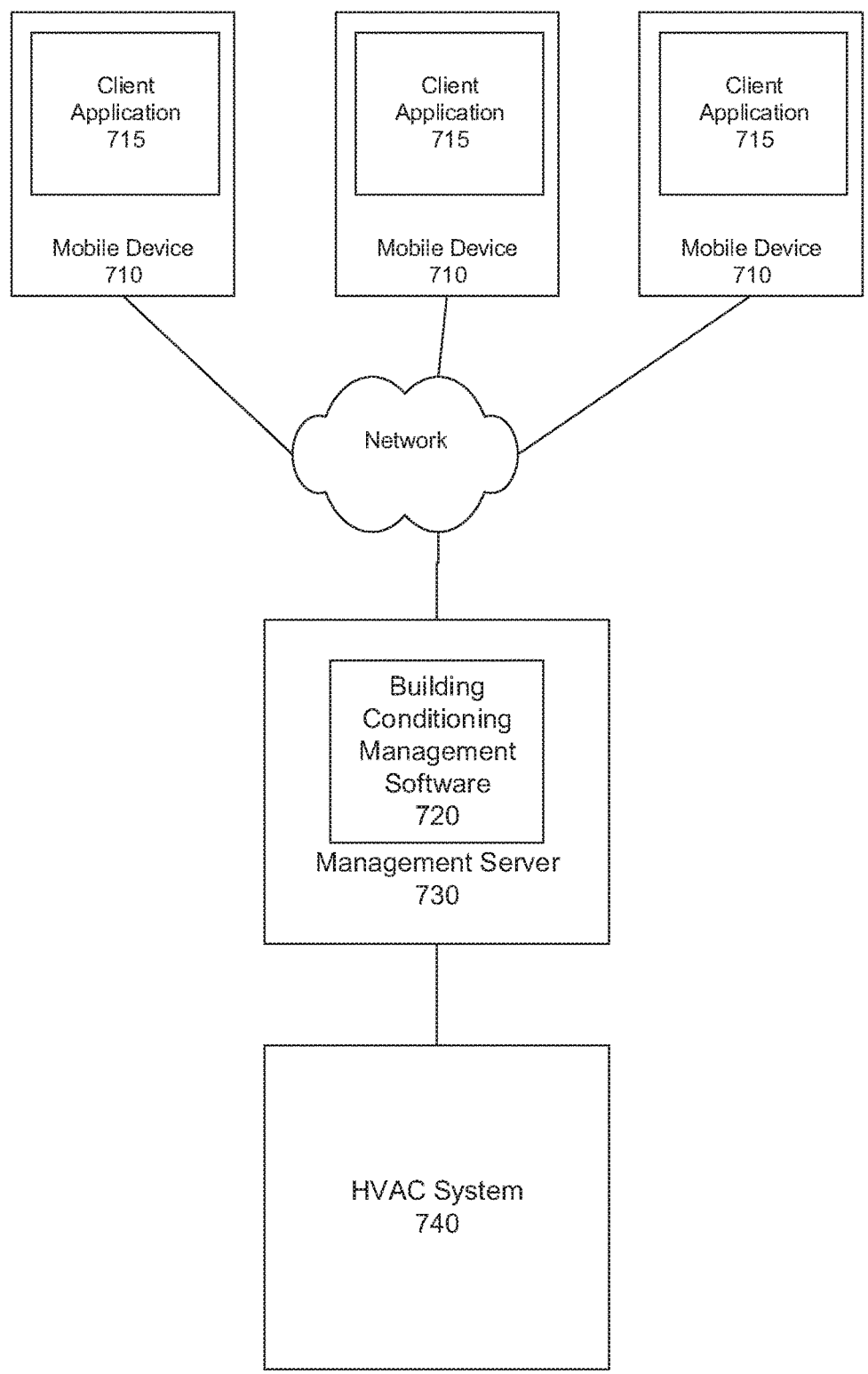
FIG. 7 is a block diagram representation of a building conditioning management system that can be used to implement certain embodiments of the invention.

FIG. 7 illustrates a building conditioning management system according to one embodiment of the invention. The system includes a client application 715 running on a plurality of mobile devices 710. The client application 715 tracks user entries to and exits from the building and/or user location within a building. The client application 715 communicates with building conditioning management software 720 running on a management server 730 to notify the software 720 of a user's entry and exit events relative to a building and/or a user's location within the building. The building conditioning management software 720 estimates the occupancy of the building and/or zones within the building to determine how to condition the building. The management server 730 communicates with and directs a HVAC system 740, which operates to condition the building. The management server 730 may also control other conditioning systems, such as building lighting systems.

FIGS. 1-6, and the corresponding description, set forth various methods for conditioning a building. The methods of FIGS. 1-6 may be implemented in other systems, and the invention is not necessarily limited to the system illustrated in FIG. 7. As a person skilled in the art would understand, the building conditioning management system may be constructed in any number of ways within the scope of the present invention.

Figure 1:
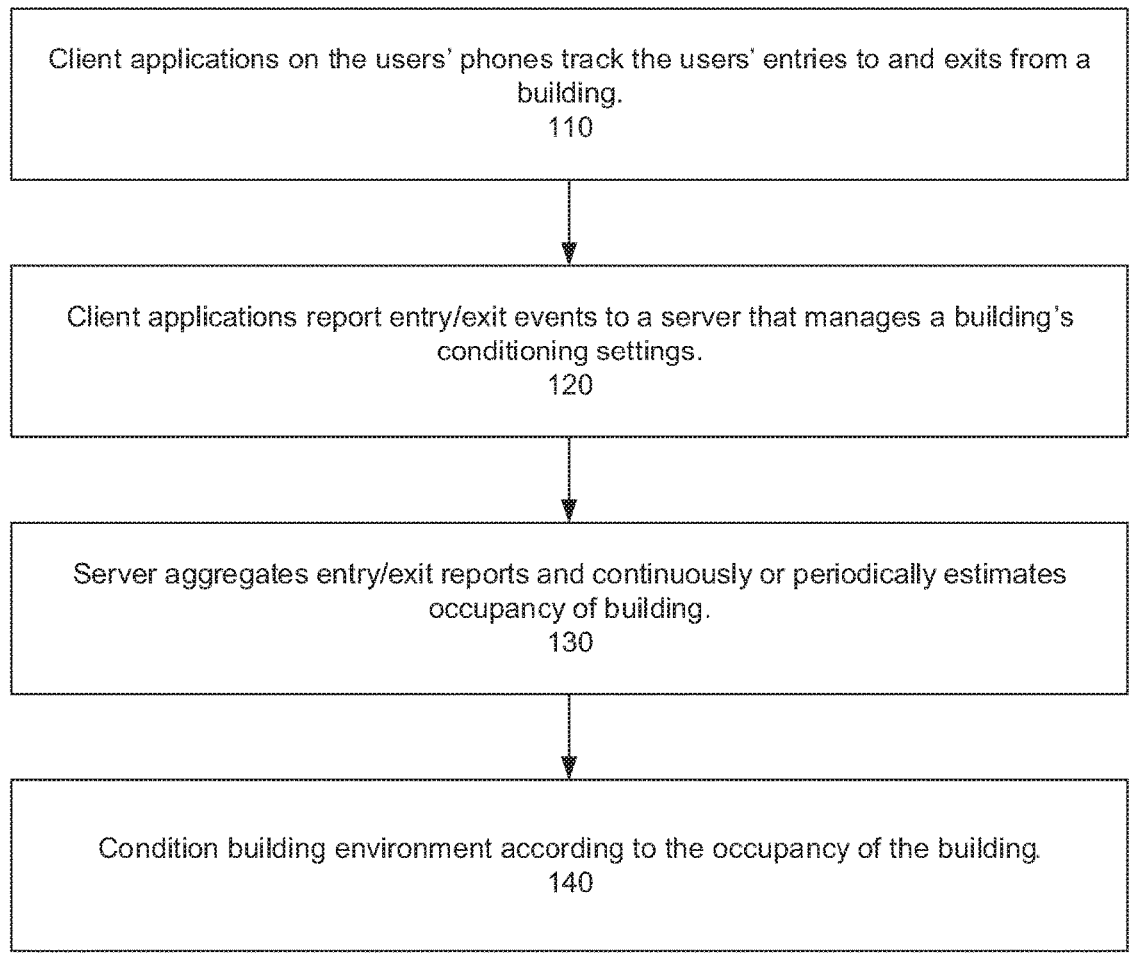
FIG. 1 is a flowchart that illustrates a method, according to one embodiment, for conditioning a building environment based on the occupancy of an entire building.

In one embodiment, as seen in FIG. 1, a building environment is conditioned based on the occupancy of the entire building. The client application on the users' phones track the users' entries to and exits from a building (step 110). The users may be people that are associated with the building (e.g., people who work in the building). The client applications report entry/exit events to a server that manages a building's conditioning settings (step 120). The events may be reported in real-time or substantially real-time.

The server aggregates entry/exit reports and continuously or periodically estimates occupancy of the building (step 130). In certain embodiments, the occupancy of the building is continuously tracked in substantially real-time as entry/exit events are reported by the mobile devices. In other embodiments, the occupancy of the building is calculated on a periodic basis (e.g., every 15 minutes). In certain embodiments, the server may estimate occupancy more frequently during certain time periods (e.g., between 8:00 AM and 6:00 PM). In certain embodiments, the occupancy estimates are also based at least in part on historical entry/exit pattern data.

The system then conditions the building environment according to the occupancy of the building (step 140). In one embodiment, the server monitors estimated occupancy to determine if the occupancy is above or below a predetermined threshold. The predetermined threshold may be in percentages of the building's occupants (e.g., above 5%) or in absolute numbers (e.g., one person or greater). The threshold may be differentiated based on groups or class. For example, the threshold may be 5% of the developers or technicians and 1% of the managers. If the estimated occupancy rises above the threshold, the HVAC system is set to the occupied mode. If it falls below the threshold, the HVAC system is switched to the unoccupied mode.

In certain embodiments, the system may be adaptive and/or predictive and may switch to an occupied mode a predetermined period of time before the expected occupancy. For example, if it takes the HVAC system about 45 minutes to heat/cool/or ventilate a space in order to reach its set point, the building conditioning management system may transition the HVAC system from the unoccupied mode to the occupied mode 45 minutes prior to the expected occupancy.

In certain embodiments, the server may monitor for multiple occupancy thresholds, and there may be multiple modes of operation for the HVAC system, where as occupancy increases, the amount of conditioning (heating, cooling, ventilation) increases. This is particularly the case with regard to ventilation. In certain embodiments, there may be one threshold for heating and cooling and multiple thresholds for ventilation. In some embodiments, ventilation may be increased gradually or substantially linearly as a function of occupancy.

Figure 2:
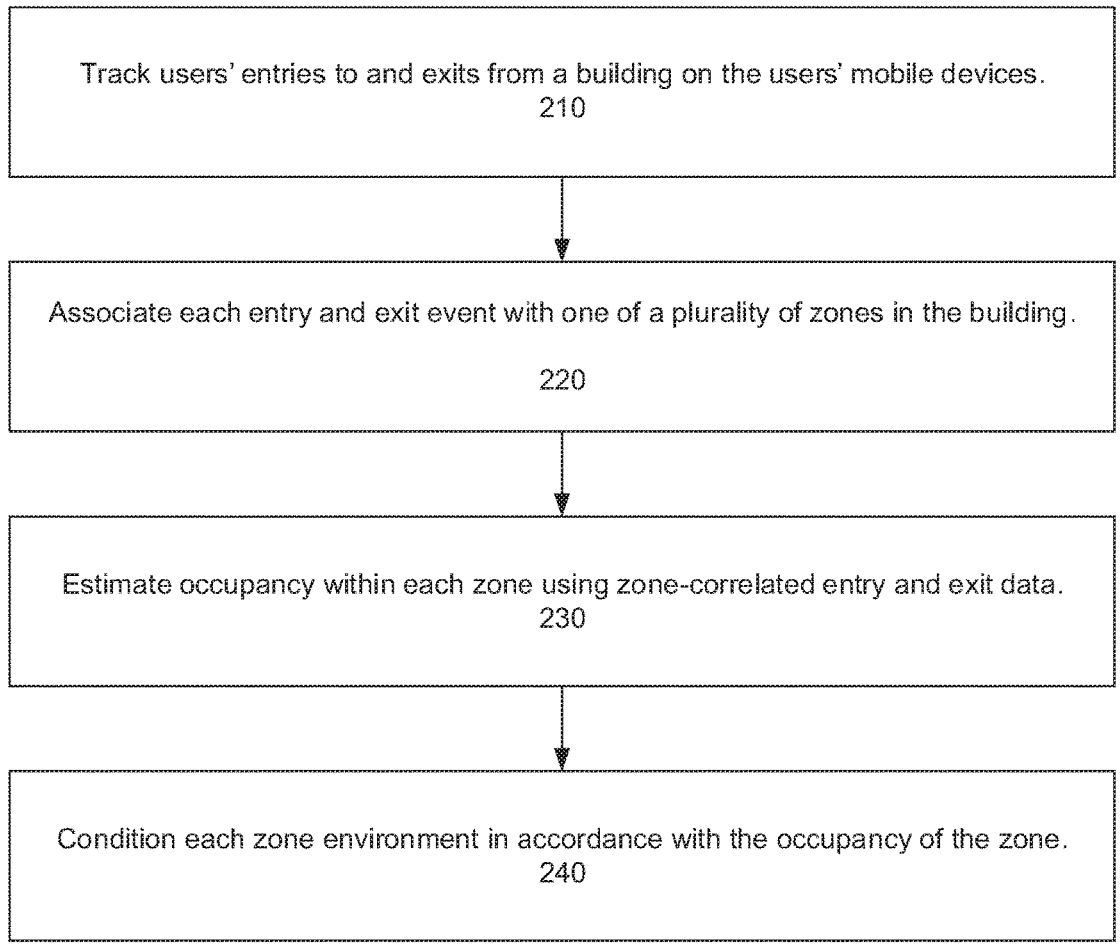
FIG. 2 is a flowchart that illustrates a method, according to one embodiment, for conditioning individual zones based on the occupancy within the zones.

In another embodiment, as seen in FIG. 2, the system estimates occupancy on a per zone basis. The system tracks the users' entries to and exits from a building on the users' mobile devices (step 210), and each entry and exit event is then associated with one of a plurality of zones (e.g., one zone per floor) in the building (step 220). In one embodiment, each user is associated with a primary zone. A user, via the client application, may be prompted to specify his primary zone when he enters the building or the user's primary zone may be part of the user's profile. Typically, a user's primary zone would include his office location, but it may also include all common areas to which he has access. In this embodiment, when a user enters the building, the user's entry event is associated with the user's primary zone.

In a further embodiment, the system has access to a user's calendar and is able to obtain calendar events that are associated with a time and location. Each location is mapped to a zone. If a calendar event indicates a user is likely to be in another zone during a certain time period, then the user will be temporarily associated with the other zone during the time period. See FIG. 3 for an example embodiment in which the system uses calendar data to associate a user with a zone.

The system estimates occupancy within each zone using zone-correlated entry and exit data (step 230). When a user enters the building, the occupancy of the zone associated with the user is incremented by one. When a user exits a building, the occupancy of the zone last associated with the user is decremented by one. If the system has calendar access, the zone occupancy is incremented and decremented as applicable at the start and end of a calendar event.

Each zone environment is then conditioned in accordance with the occupancy of the zone (step 240). For example, the HVAC system's setting for each zone is adjusted based on the occupancy of the zone. In one embodiment, the system switches the zone to an occupied mode when at least one user is in the zone. In certain embodiments, the system, on a per-zone level, re-computes the minimum required airflow values as a function of estimated occupancy. If system has access to calendar data, the system may preemptively condition a conference room in which a meeting is scheduled to take place based on the estimated number of participants (e.g., the number of participants who have responded affirmatively to the calendar event). Likewise, the system may not condition the participants' offices when they are in a meeting outside their offices. In certain embodiments, the occupancy of the zones are estimated continuously or periodically throughout a period of time and, for each zone, the conditioning of the zone is adjusted during the period of time in response to one or more threshold changes in the occupancy estimates for the zone.

Figure 3A:
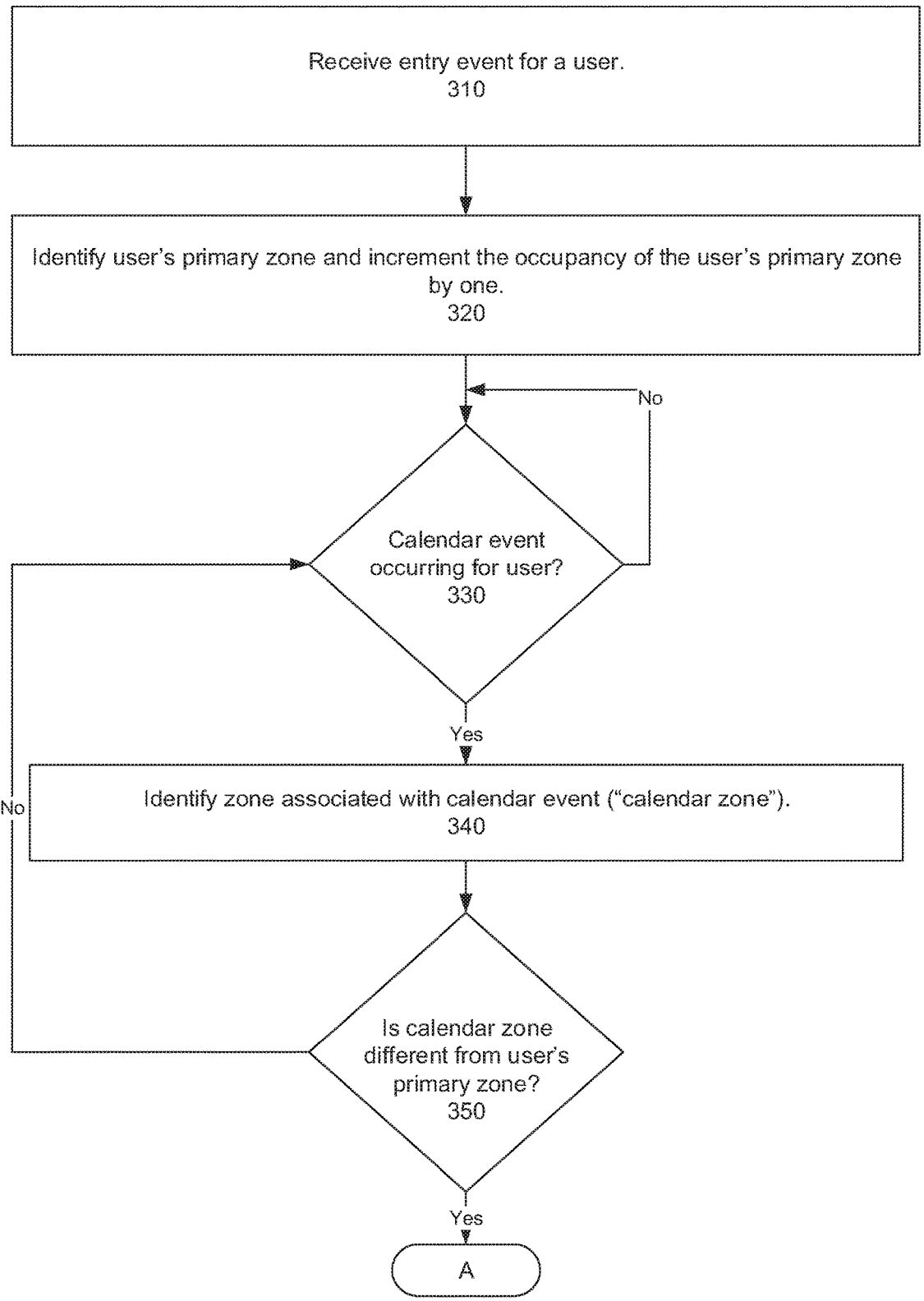
FIGS. 3A-3B are flowcharts that illustrate a method, according to one embodiment, for associating an entry event with a zone when the system has access to a user's calendar data.
Figure 3B:
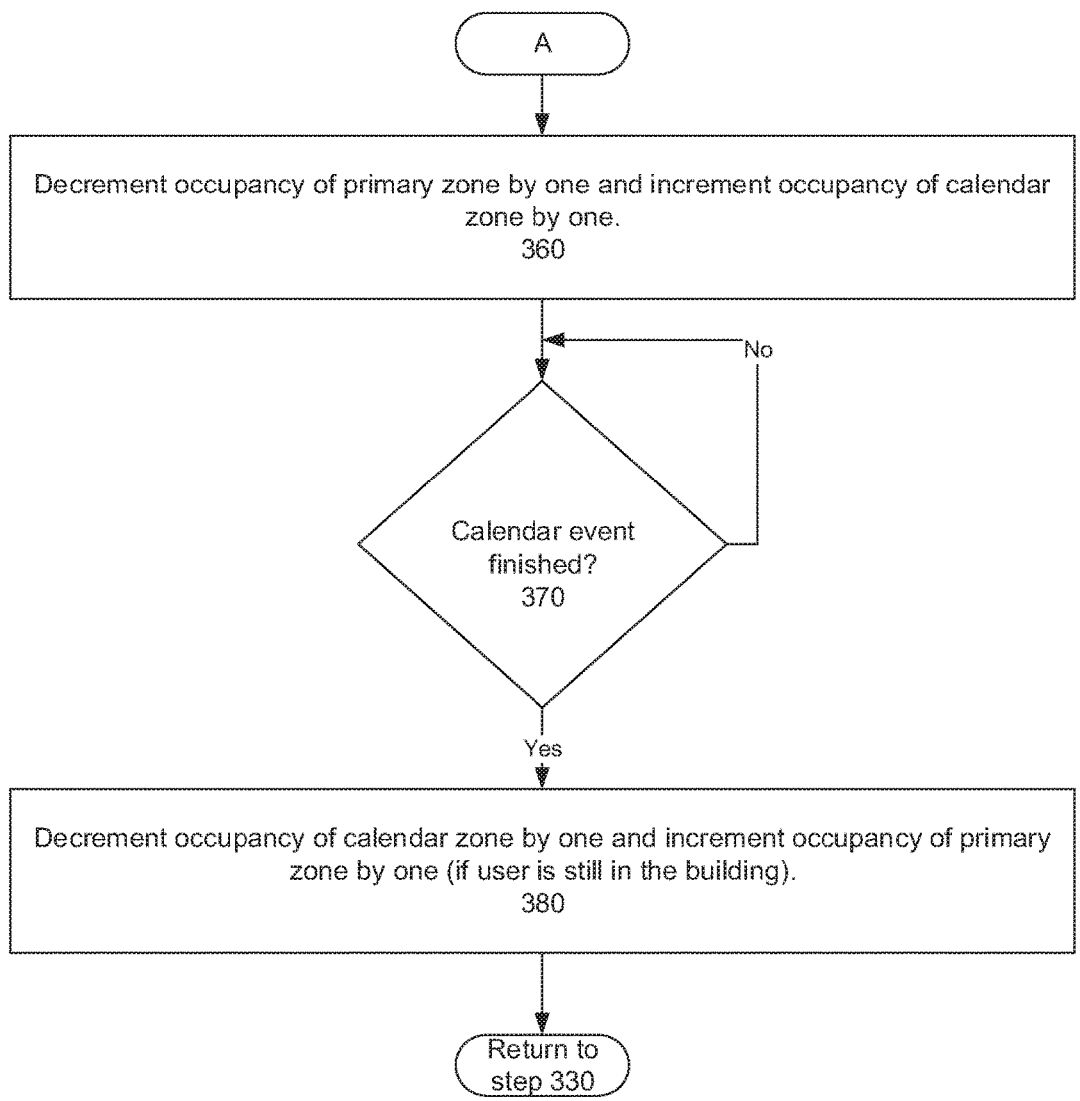

FIGS. 3A-3B illustrate a method, according to one embodiment, for associating an entry event with a zone when the system has access to a user's calendar data. The system receives an entry event for a user (i.e., the client application alerts the server that the user has entered the building) (step 310). The user's primary zone is identified and the occupancy of the user's primary zone is incremented by one (step 320). While the user is in the building, the system monitors whether any calendar events are occurring for the user (step 330). Monitoring for calendar events may be performed by the client application or by the server depending on the configuration of the calendaring system. If there is a calendar event occurring for the user, the zone associated with the calendar event (or the "calendar zone") is identified (step 340). The system then determines whether the calendar zone is different from the user's primary zone (step 350). If the calendar zone is the same as the user's primary zone, the system returns to step 330. If the calendar zone is different from the user's primary zone, then the system decrements occupancy of the primary zone by one and increments occupancy of the calendar zone by one (step 360). When the calendar event has finished, the system decrements the occupancy of the calendar zone by one and increments the occupancy of the primary zone by one (if the user is still in the building) (steps 370 and 380). The system then returns to step 330. If at any time during the process of FIG. 3, the user leaves the building, the occupancy of the zone last associated with the user is decremented by one and the process ends for the user.

Figure 4:
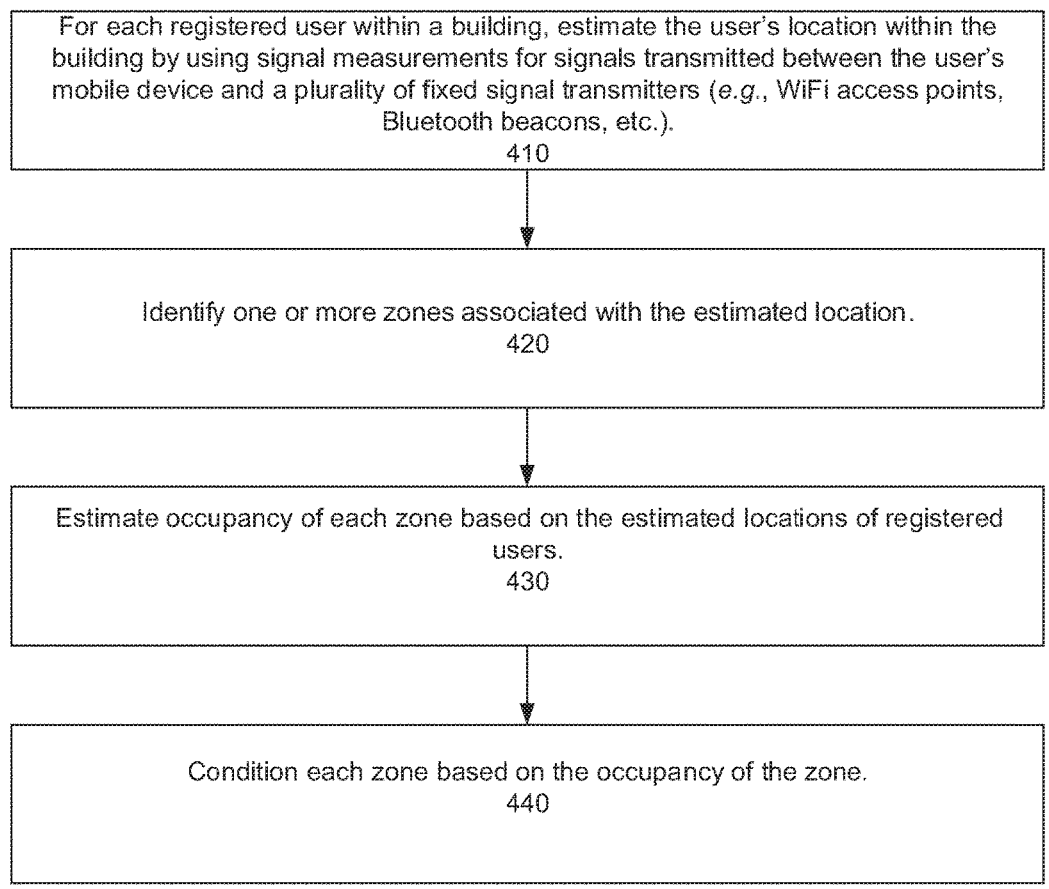
FIG. 4 is a flowchart that illustrates an alternate method, according to one embodiment, for conditioning individual zones based on the occupancy within the zones.

In an alternate embodiment of the invention, a user's mobile device is used to estimate a user's location within the building using an indoor localization technique. FIG. 4 illustrates an example of this embodiment. For each registered user within a building, the user's location within the building is estimated by using signal measurements for signals transmitted between the user's mobile device and a plurality of fixed signal transmitters (e.g., WiFi access points, Bluetooth beacons, etc.) (step 410). In one embodiment, step 410 uses a radio-frequency (RF) localization technique to estimate a user's position. There are several RF localization techniques. Classical techniques involve measuring time-distance of arrival (TDOA) and angle of arrival (AOA), where a receiver estimates the distance between the receiver and the sender by measuring the time taken for a RF wavefront to travel from the sender to the receiver and back (TDOA), and the angle from which it came (AOA). These are among the most robust techniques but they require specialized hardware with high-precision clocks and high-frequency signal processing (since light travels at roughly 1 ft/ns, clock rates must be of the same order to achieve good accuracy). For this reason, these techniques are typically used in high-end applications.

Alternatively, signal-strength based localization may be used to estimate a user's position within a building. Most commodity radio hardware (e.g., Wi-Fi cards, Bluetooth transceivers, etc.) provides some measurement of the signal strength at the receiver (typically in the form of the Received Signal-Strength (RSSI) metric). Localization using this technique often relies on assuming that the signal power level at the transmitter declines according to a power law and then modeling the decline using an RF fading model (Rayleigh or Rican models are popular choices). By listening to multiple senders, a receiver can triangulate their positions. The effectiveness of signal-strength based localization depends on the indoor environment (e.g., amount interference from other transmitters and paths for RF propagation).

Another indoor localization technique is to examine a set of nearby transmitters to create a "fingerprint," and corresponding that fingerprint with a location. In some sense, this is simply applying a low-pass filter to a fading model and only using the information corresponding to whether or not each transmitter can be "heard." When used with low-power transmitters like Bluetooth, whose range is only tens of meters, combined with high-density environments (i.e., having many transmitters), this technique can result in good accuracy (although variations due to deployment densities and propagation environments are still inevitable).

Those skilled in the art will appreciate that other indoor localization methods may be used to estimate a user's location within the building. For example, enabled Bluetooth beacons may be used to allow a user to configure his phone to recognize when the phone is near his computer and to only indicate that his office is occupied when the phone is near the computer. In another example, phones equipped with high-sensitivity GPS receivers may be used to identify a user's location within a building.

Indoor localization can be improved with user feedback. If users enter their location (into the client application) at a particular time, the system can use the entered location to learn the relationship between the signal transmitters (e.g., WiFi access points) and locations in the building.

Once a location estimate for the user has been obtained, one or more zones associated with the estimated location are identified (step 420). If a localization method is not precise enough to place a user within a particular zone, a "weighting" may be applied that would indicate that all the zones that the user could be in are "occupied." This is due to the fact that many indoor localization techniques provide a probability density estimate for the location of the user rather than a single point (although the density estimate may be summarized into a single maximum-likelihood estimate). If a density estimate is available, the system may use that instead of a point estimate for the user's location in order to avoid the possibility of under-ventilating. This could happen in several ways. In a conservative strategy, the system simply assumes that any zone in which there is a non-negligible probability of the occupant being there is occupied as if the occupant were, in fact, there. This results in over-ventilation when the location estimate is bad, but nearly guarantees that any zone the user is in will have the appropriate ventilation.

In an alternate strategy, the probability density estimate is used to compute the probability the user is in any particular zone. For instance, there might be a 40% chance the user is in zone A and a 60% chance the user is in zone B. The system then allocates the ventilation that the user requires proportionally between the two zones (i.e., if 15 CFM per user is required, zone A receives 6 CFM and zone B receives 9 CFM). In this case, the system delivers exactly the required ventilation, although it may be somewhat misdirected. This strategy is consistent with certain building codes that do not require that the ventilation be delivered to the zone in which the user is located as long as it is delivered to somewhere in the building.

The system estimates occupancy of each zone based on the estimated locations of registered users (step 430). The user's location may be estimated continuously, periodically, at designated times, or on demand. Similar to previous method, this method may be used in conjunction with calendar data, where, based on calendar data, the system may preemptively condition a zone. For example, the system may preemptively condition a conference room in which a meeting is scheduled to take place based on the estimated number of participants (e.g., the number of participants who have responded affirmatively to the calendar event). Likewise, the system may not condition the participants' office when they are in a meeting outside their offices. Each zone is conditioned based on the occupancy of the zone (step 440). In certain embodiments, the occupancy of the zones are estimated continuously or periodically throughout a period of time and, for each zone, the conditioning of the zone is adjusted during the period of time in response to one or more threshold changes in the occupancy estimates for the zone.

Figure 5:
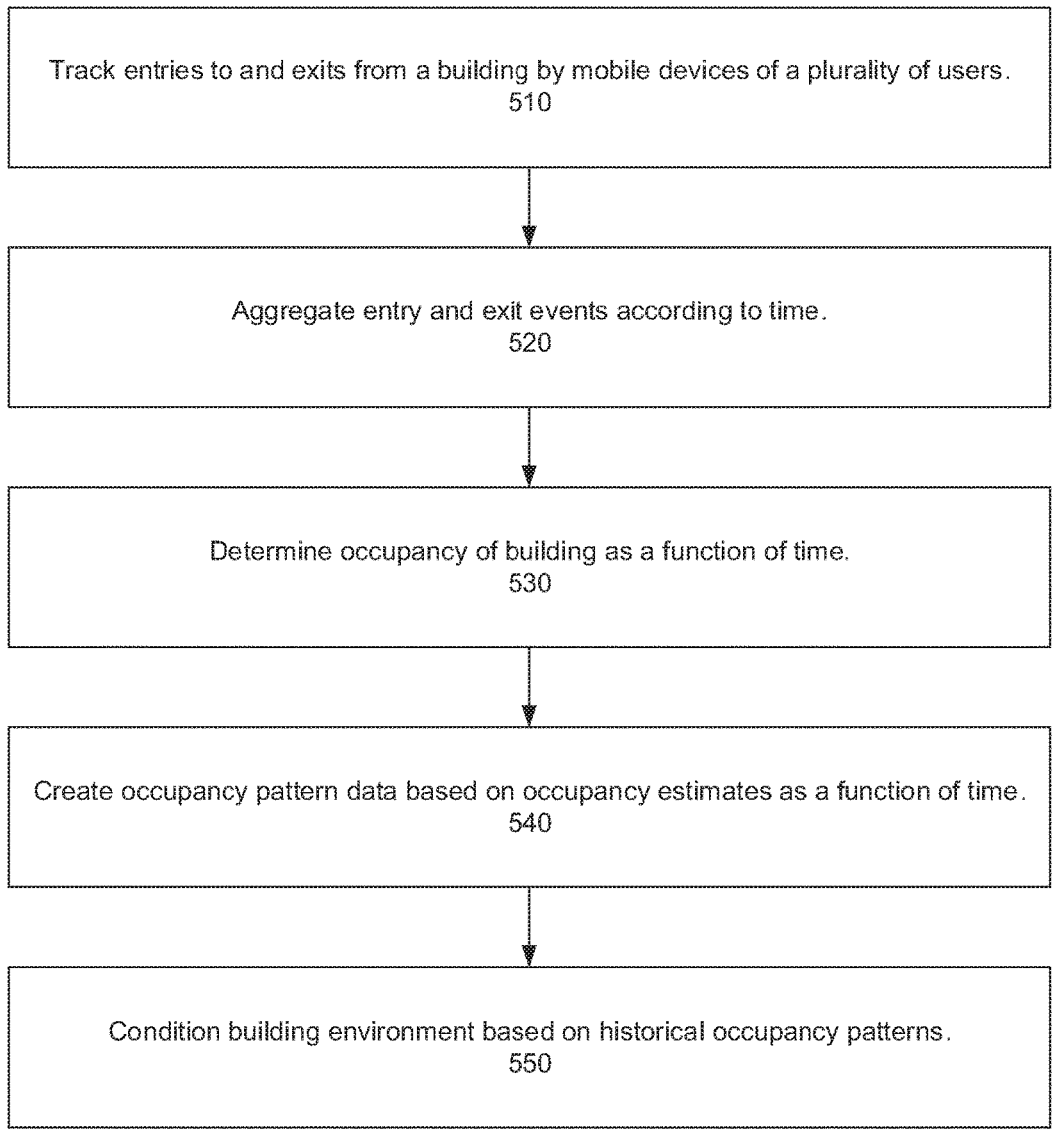
FIG. 5 is a flowchart that illustrates a method, according to one embodiment, for creating occupancy pattern data and using occupancy patterns to condition a building.

In another embodiment, as seen in FIG. 5, occupancy pattern data is created and used to condition a building. The system tracks entries to and exits from a building by mobile devices of a plurality of users (step 510). The events are associated with a time stamp. As discussed above, in one embodiment, the client application tracks the user's entries to and exits from a building and reports the events to the server. The entry and exit events are aggregated according to time (step 520). The occupancy of the building is determined as a function of time (step 530). The system creates occupancy pattern data based on the occupancy estimates as a function of time (step 540). For example, the occupancy pattern data may indicate that the building has an occupancy of n1 at 6:00 AM, n2 at 7:00 AM, n3 at 8:00 AM, etc. Recent occupancy estimates for a time period may be weighted more heavily than older estimates. The building environment is then conditioned based on historical occupancy patterns (e.g., on a given day or time) (step 550). The entry and exit data may be associated with a zone and steps 530-550 may be performed for each zone to enable the building to be conditioned on a zone-by-zone basis.

Figure 6:
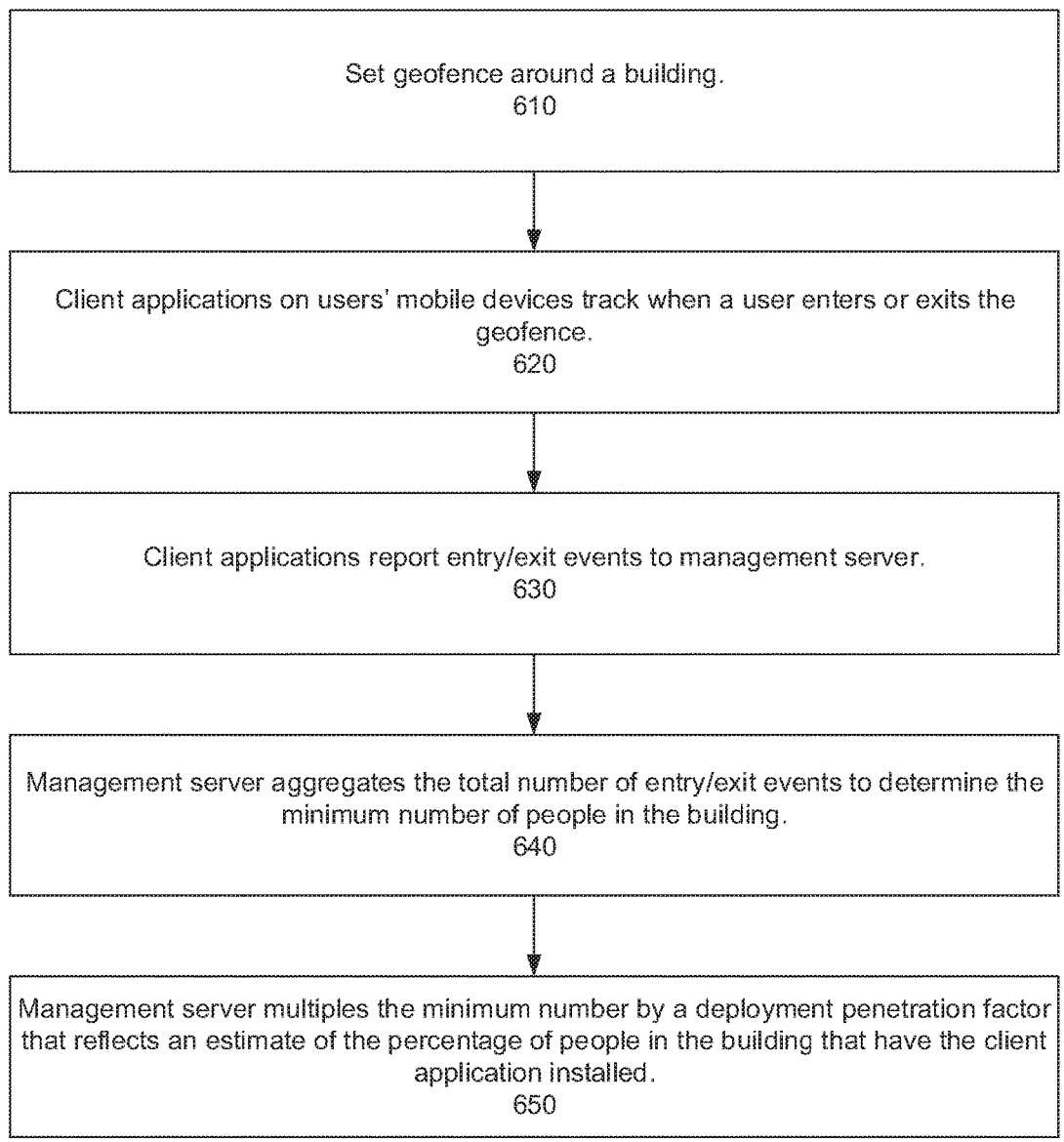
FIG. 6 is a flowchart that illustrates a method, according to one embodiment, for estimating occupancy.

FIG. 6 illustrates an example method for estimating occupancy of a building. A geofence, which is a virtual perimeter, is set around a building (step 610). The client applications on users' mobile devices track when a user enters or exits the geofence (step 620). The mobile phone fires an alert when a user enters or exits the geofence (an entry or exit event). The phone logs each event in association with the time the event occurred. Client applications report entry/exit events to the management server (step 630). The management server aggregates the total number of entry/exit events to determine the minimum number of people in the building (step 640). The management server multiples the minimum number by a deployment penetration factor (DPF) that reflects an estimate of the percentage of people in the building that have the client application installed (step 650). The DPF may be derived from (i) the number of people who have the client application installed and (ii) the maximum occupancy estimates for the building or other data about the number of people who might be in the building at the time.

In other words, the DPF is simply an estimate of what fraction of people use the mobile application on a regular basis, relative to the building's population. Obtaining a count of active users may be obtained by observing logs from the server. Estimating the total number of people in the building may be obtained from card-badge data, maximum code occupancy, or many other sources. The DPF is simply the quotient of these numbers and all occupancy estimates are to be increased proportional to 1/DPF. For example, if only 20% of occupants provide regular data, the minimum number calculated in step 640 is multiplied by 5 to get the estimated occupancy of the building.

Each entry/exit event may be associated with a zone, and steps 640 and 650 may be performed for each zone. Steps 640 and 650 may be done in real-time to determine a real-time, current occupancy of the building (as described in FIG. 1), or they may be performed over data aggregated over a period of time (as described in FIG. 5).

The methods described with respect to FIGS. 1-6 are embodied in software and performed by a computer system (comprising one or more computing devices) executing the software. A person skilled in the art would understand that a computer system has a memory or other physical, computer-readable storage medium for storing software instructions and one or more processors for executing the software instructions.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. A method, performed by a computer system, for conditioning a building environment based on occupancy estimates, wherein the building has a plurality of zones, the method comprising:

for each of a plurality of users:

determining a probability density estimate for the user's location within the building using an indoor localization technique, wherein the indoor localization technique comprises using measurements related to signals transmitted between the user's mobile device and a plurality of fixed signal transmitters to estimate the user's location and wherein the computer system enables each of the users to enter his or her location at a particular time and the computer system uses the entered location to improve the indoor localization technique by learning the relationship between the signal transmitters and the user's location in the building, and identifying one or more zones associated with the probability density estimate for the user's location;

estimating occupancy of each zone based on the probability density estimates of users associated with each of the one or more zones, wherein the probability density estimate of each of the users associated with the one or more zones is (i) weighted such that a non-zero probability is treated as the user being in the zone or (ii) weighted based on a percentage likelihood that the user is in the zone; and conditioning each zone in accordance with the estimated occupancy of the zone.

2. The method of claim 1, wherein the occupancy of the zones are estimated continuously or periodically throughout a period of time and, for each zone, the conditioning of the zone is adjusted during the period of time in response to one or more threshold changes in the occupancy estimates for the zone.

3. The method of claim 1, wherein the indoor localization technique comprises using GPS.

4. A non-transitory computer-readable medium comprising a computer program that, when executed by a computer system, enables the computer system to perform the following method for conditioning a building environment based on occupancy estimates, wherein the building has a plurality of zones, the method comprising:

for each of a plurality of users:
determining a probability density estimate for the user's location within the building using an indoor localization technique, wherein the indoor localization technique comprises using measurements related to signals transmitted between the user's mobile device and a plurality of fixed signal transmitters to estimate the user's location and wherein the computer system enables each of the users to enter his or her location at a particular time and the computer system uses the entered location to improve the indoor localization technique by learning the relationship between the signal transmitters and the user's location in the building, and identifying one or more zones associated with the probability density estimate for the user's location;

estimating occupancy of each zone based on the probability density estimates of users associated with each of the one or more zones, wherein the probability density estimate of each of the users associated with the one or more zones is (i) weighted such that a non-zero probability is treated as the user being in the zone or (ii) weighted based on a percentage likelihood that the user is in the zone; and conditioning each zone in accordance with the estimated occupancy of the zone.

5. The non-transitory computer-readable medium of claim 4, wherein the occupancy of the zones are estimated continuously or periodically throughout a period of time and, for each zone, the conditioning of the zone is adjusted during the period of time in response to one or more threshold changes in the occupancy estimates for the zone.

6. The non-transitory computer-readable medium of claim 4, wherein the indoor localization technique comprises using GPS.

7. A computer system for conditioning a building environment based on occupancy estimates, wherein the building has a plurality of zones, the system comprising:

one or more processors;
one or more memory units coupled to the one or more processors, wherein the one or more memory units store instructions that, when executed by the one or more processors, cause the system to perform the operations of:

for each of a plurality of users:
determining a probability density estimate for the user's location within the building using an indoor localization technique, wherein the indoor localization technique comprises using measurements related to signals transmitted between the user's mobile device and a plurality of fixed signal transmitters to estimate the user's location and wherein the computer system enables each of the users to enter his or her location at a particular time and the computer system uses the entered location to improve the indoor localization technique by learning the relationship between the signal transmitters and the user's location in the building, and identifying one or more zones associated with the probability density estimate for the user's location;

estimating occupancy of each zone based on the probability density estimates of users associated with each of the one or more zones, wherein the probability density estimate of each of the users associated with the one or more zones is (i) weighted such that a non-zero probability is treated as the user being in the zone or (ii) weighted based on a percentage likelihood that the user is in the zone; and conditioning each zone in accordance with the estimated occupancy of the zone.

8. The computer system of claim 7, wherein the occupancy of the zones are estimated continuously or periodically throughout a period of time and, for each zone, the conditioning of the zone is adjusted during the period of time in response to one or more threshold changes in the occupancy estimates for the zone.

9. The computer system of claim 7, wherein the indoor localization technique comprises using GPS.

* * * * *